July 3, 1956     G. C. BELTMAN ET AL     2,752,994
GRAIN CAR DOOR

Filed March 17, 1952     5 Sheets-Sheet 1

INVENTORS:
George C. Beltman and
Donald H. Sweet
By: Donald H. Sweet, Atty.

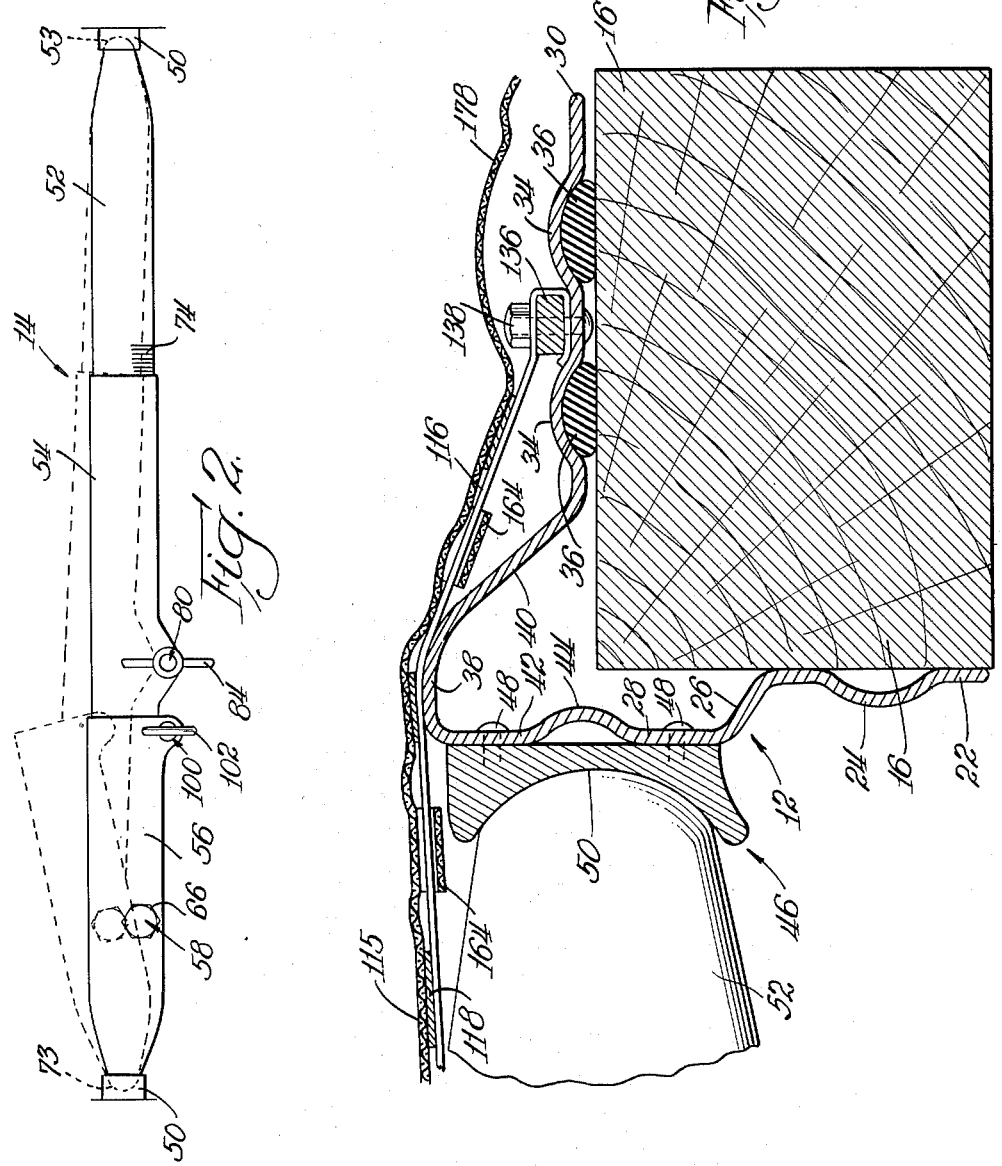

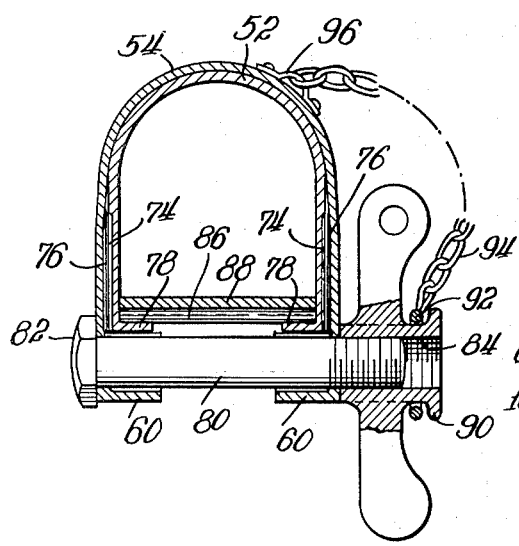
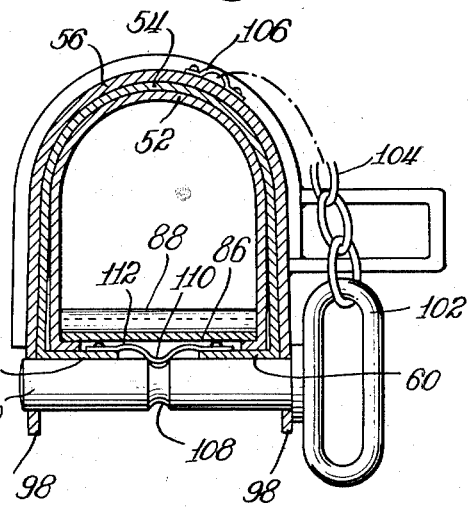
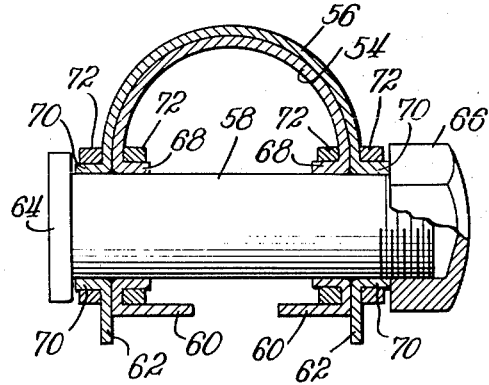
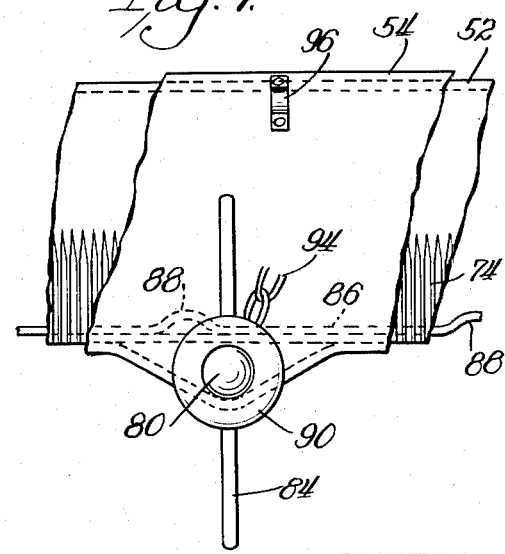

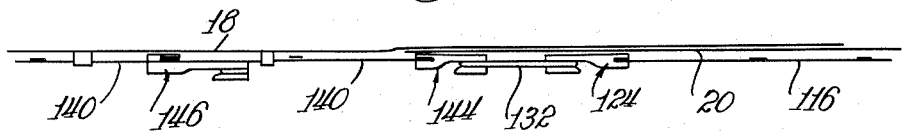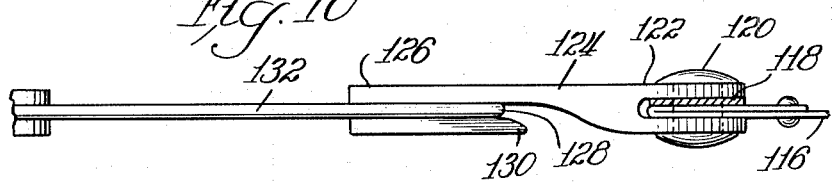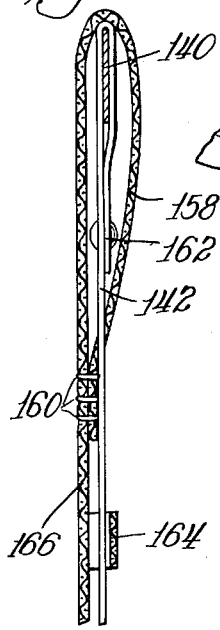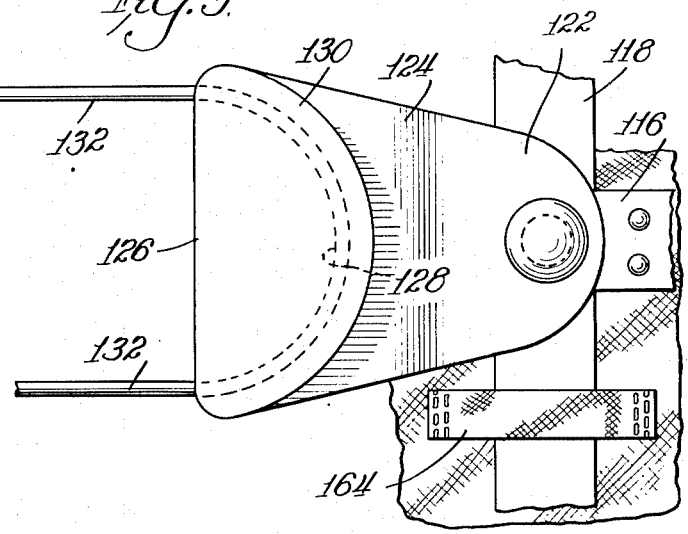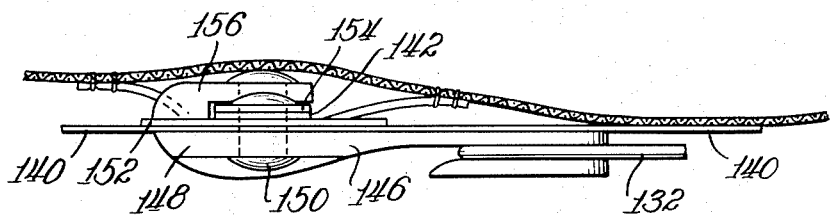
INVENTORS:
George C. Beltman and
Donald H. Sweet
By:- Donald H. Sweet  Atty.

July 3, 1956     G. C. BELTMAN ET AL     2,752,994
GRAIN CAR DOOR
Filed March 17, 1952     5 Sheets-Sheet 5
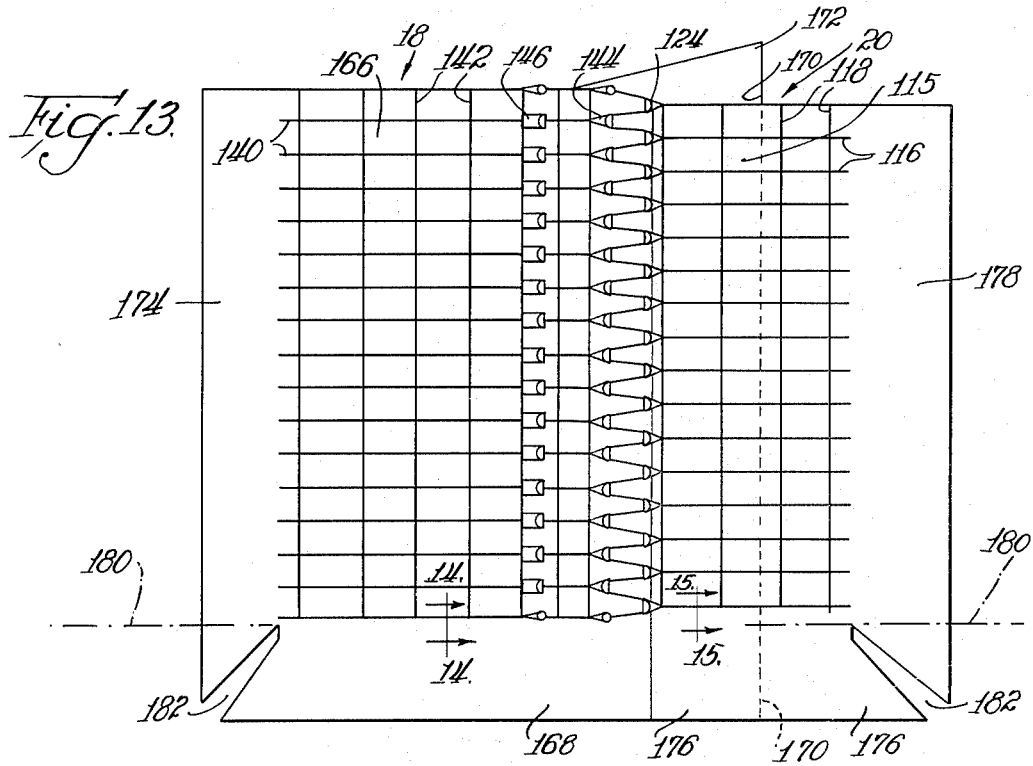
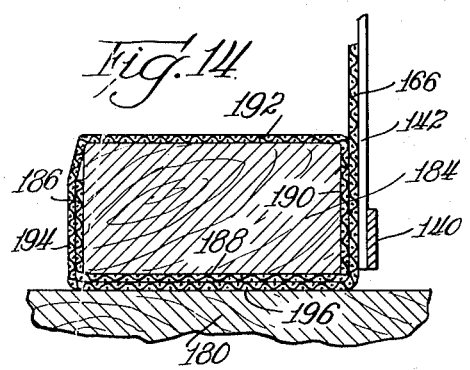
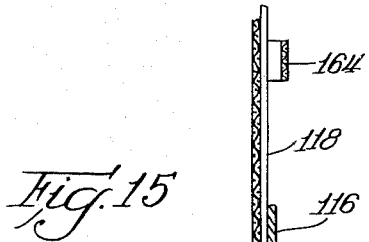
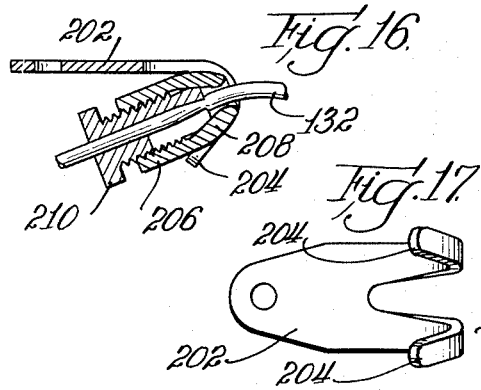
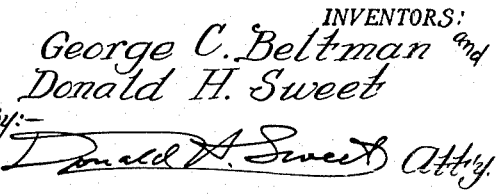
INVENTORS:
George C. Beltman and
Donald H. Sweet
By: Donald H. Sweet Atty.

United States Patent Office 2,752,994
Patented July 3, 1956

2,752,994

GRAIN CAR DOOR

George C. Beltman, Chicago, and Donald H. Sweet, Evanston, Ill.; said Sweet assignor to said Beltman Application March 17, 1952, Serial No. 277,012

15 Claims. (Cl. 160—368)

Our invention relates to shipping and includes, among its objects and advantages, an improvement in enclosures of the type suitable for the transportation in box cars of bulk wheat, shelled corn, oats, and other granular materials. In the accompanying drawings:

Figure 2 is an elevation of one of the struts expanded to fit in an eight-foot door;

Figure 3 is a section of one sidepost as on line 3—3 of Figure 1;

Figure 4 is a section through a strut as on line 4—4 of Figure 1;

Figure 5 is a section of the strut on line 5—5 of Figure 1;

Figure 6 is a section of the strut on line 6—6 of Figure 1;

Figure 7 is a fragmentary side elevation of the clamping means shown in Figure 4;

Figure 8 is a partial diagrammatic section of the blanket only as on line 8—8 of Figure 1, with the blanket adjusted for an eight-foot door.

Figure 9 is an enlarged elevation of one of the lacing clips and associated parts;

Figure 10 is an elevation of the clip of Figure 9;

Figure 11 is an elevation similar to Figure 10 illustrating a lacing clip located remote from the edge of its blanket;

Figure 12 is a detail section of line 12—12 of Figure 1;

Figure 13 is a diagram indicating the cutting of the canvas for the blanket;

Figure 14 is a section on line 14—14 of Figure 13 indicating the condition of the lower edge of the blanket installed in a car;

Figure 15 is a section on line 15—15 of Figure 13 showing the condition of the lower edge of the other blanket half.

Figure 16 is a sectional view of a quick-detachable fastening means for the lacing; and Figure 17 is a side elevation of the claw of Figure 16.

Figure 1:
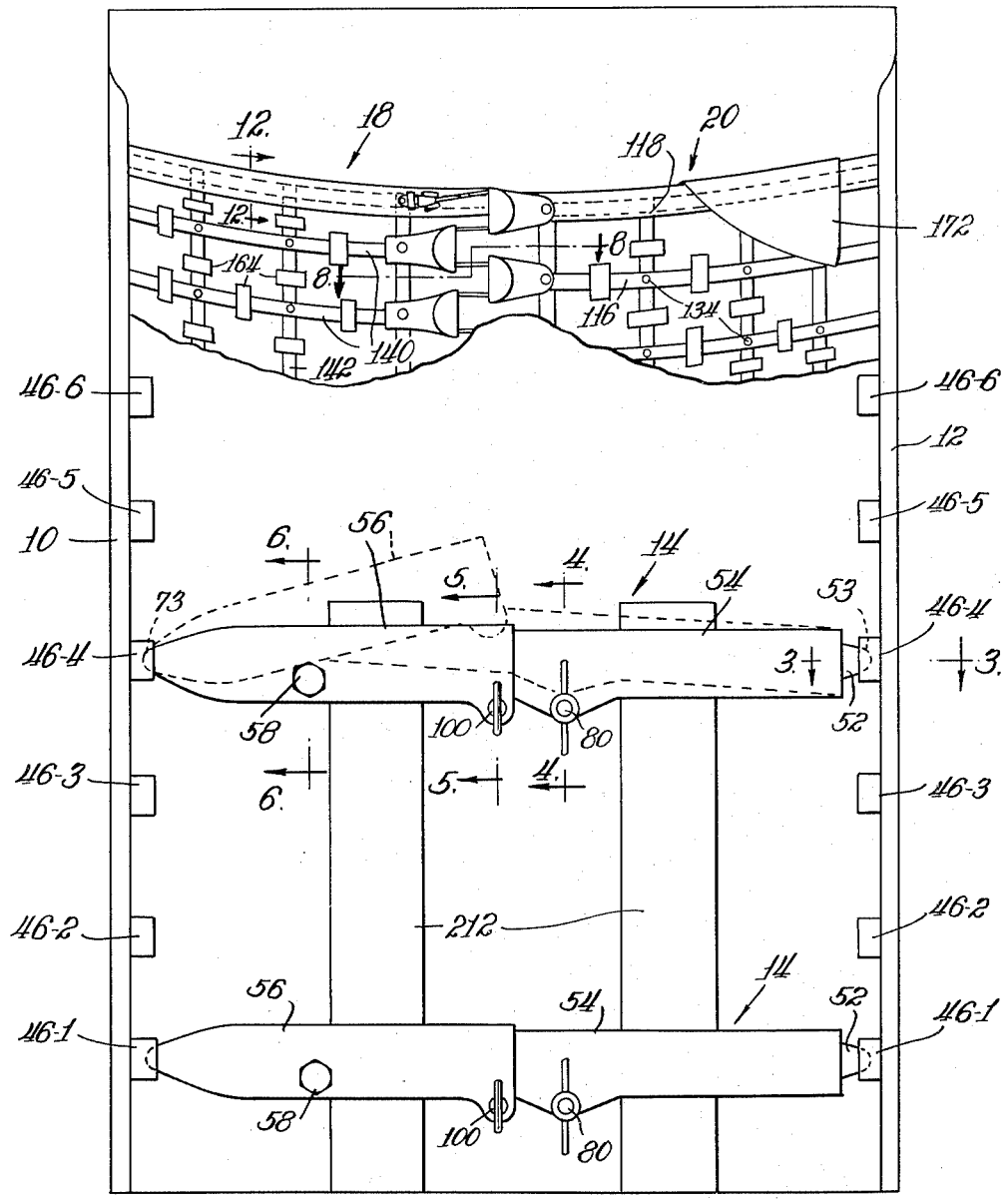
Figure 1 is an outline of the door opening in such a box car illustrated as six feet wide and nine feet high, equipped with a closure according to the invention, with most of the blanket omitted for clearness of illustration.

In the embodiment of the invention selected for illustration, the closure comprises the left post 10 and right post 12 and a plurality of struts 14 for forcing the posts into firm engagement with the adjacent members of the box car, such as the wooden pillar 16 illustrated in Figure 3. The left post 10 has a half blanket 18 affixed to it along the vertical left edge of the blanket and the right post 12 has a right half blanket 20 similarly affixed.

The right post 12, as best indicated in Figure 3, includes a short leg ending in a vertical edge 22 that stops just short of projecting beyond the pillar 16. Back of its edge, the short leg is formed into a stiffening groove 24 and then offset inwardly at 26 and continued back at 28.

The long leg also ends in a vertical edge at 30 and is provided with two stiffening grooves 34 in which are fastened battens 36 of tough sponge rubber to form a seal against the inner face of the pillar 16. The connection between the long leg and the short leg is the bulged portion 38, which extends inwardly into the car, being joined to the long leg by the inclined reach 40 and to the short leg by a section 42 united to the portion 28 of the short leg by a grooved stiffening portion 44. It will be apparent that such a configuration can be folded out of a single flat piece of sheet metal to constitute a very light and rigid beam structure.

On either side of the stiffening groove 44 the post is flat, to furnish seating abutment for a plurality of thrust sockets 46. Each thrust socket is a body with a flat side, suitably attached to the post as by rivets 48 and an outwardly facing socket 50. As best indicated in Figure 1, each post is provided with six such sockets specifically identified by the reference characters 46—1, 46—2, 46—3, 46—4, 46—5, and 46—6.

Referring now more particularly to Figures 1 and 2, each strut is a tubular three-piece structure including one pivotal connection and one telescoping connection between the pieces so that the telescoping connection can be used to adjust the strut to the correct length and thereafter the pivotal connection can be forced into dead center position to act as a toggle and fasten both posts in firm abutment with the adjacent pillars until the strut is removed. The right end member 52 of the strut is a downwardly opening channel ending in a spherical tip at 53 of a size to fit in the socket 50. The member 52 telescopes inside the center member 54 which is a channel of generally similar configuration. The center member 54 telescopes inside the left member 56 which is a channel of similar configuration.

The members 56 and 54 are connected permanently by a pivot 58 illustrated on an enlarged scale in Figure 6. The channel 54 has downwardly extending plane legs ending in inwardly turned stiffening flanges 60. The channel 56 has corresponding plane side portions fitting over the channel 54 and ending at 62 in downwardly extending edges, so that the channel 54 can move down and out of the channel 56 without impediment. It is desirable to construct the pivot 58 to carry heavy loads. As illustrated, the pivot itself has a diameter of one and one-half inches with an integral head 64 and a fastening nut 66 which may be permanently fastened against removal in any conventional way. The side walls of the channel 54 are drawn in to define bearing surfaces at 68 and the side walls of the channel 56 are drawn outwardly to form bearing surfaces at 70. The bearing surfaces at 68 and 70 may also be reinforced by backing rings 72 outside the nipples constituting the bearings. In Figures 1 and 2 we have indicated a dotted line position for the parts, with the sections rotated around the pivot 58 about far enough to permit the spherical end 53 at the right end of the strut and the spherical end 73 at the left end of the section 56 to be inserted in the sockets 50. It will be obvious that subsequent movement of the parts to the full line position will elongate the strut, and that the muscular strength of the operator forcing the parts into alignment will be greatly magnified by movement of the toggle into dead center position.

Adjusting means, best illustrated in Figure 4, is provided for relative longitudinal adjustment of the sections 52 and 54, to adjust the strut to the exact length that will enable the operator to get a good, strong thrust when he forces the toggle home. The lower portions of the legs of the inner channel 52 are provided with V-shaped corrugations 74 measuring one-sixteenth of an inch or three thirty-seconds of an inch from edge to edge. The inner surfaces of the legs of the channel 54 are provided with duplicate corrugations 76. The flanges 60 on the channel 54 are curved downwardly to leave room between themselves and the stiffening flanges 78 on the edges of the channel 52 for the passage of the clamping bolt 80 which has an integral head 82 and carries the wing nut 84 by means of which the serrations 76 can be forced in into positive clamping engagement with the serrations 74. Along the serrated portion 74 we provide a cross-plate 86 stiffened by occasional transverse grooves 88 so that the corrugations 74 are rigidly braced and completely unyielding, whereas the serrations 76 can be moved inward easily by slight flexure of the bight of the channel 54, and forced down so that each set of corrugations enters substantially to the bottom of the other set.

Fastening means are provided to prevent loss of the wing nut 84. In ordinary use, it should not be taken off the bolt 80, but it sometimes needs to be removed for repair or assembly. We have indicated a flange 90 and a ring 92 loosely retained by the flange and connected by a length of light chain 94 to a fastening clip 96 on the bight of the channel 54.

Upon comparison of Figures 1 and 2 it will be noted that in Figure 2 the strut is about 2 feet longer than in Figure 1 and a few of the corrugations 74 project a little beyond the end of the channel 54. The corrugations 76 in the channel 54 need only be about six inches in axial extent, all adjacent to the clamping bolt 80. By extending the corrugations 74 over a little more than half the length of the channel 52, it becomes possible to get good clamping engagement with the channel 52 slid out as indicated in Figure 2.

In either condition of adjustment, the operator can grasp the central section 54 and easily insert the spherical end 53 of the section 52 in its socket. Then he can transfer one hand to the section 56 and swing it up into the dotted line position or a trifle higher and insert its spherical end 73 in the socket on the other side. If the parts have been adjusted to the right length, he will have to throw his weight on the strut to force it down into the full line position. If it falls down into that position and remains a little loose, he needs to loosen the wing nut 84 and elongate the strut one-fourth of an inch or so, so that it will develop the proper thrust when he puts it in assembled position.

Means are provided for fastening the parts of the strut in the full line position. Referring to Figures 1 and 5, side flanges of the channel 56 are extended down to form ears 98 to receive a fastening bolt 100 which lies just below and in contact with the flanges 60. As this bolt has to be removed and re-inserted by the operator, we provide means to facilitate quick removal and insertion and to prevent accidental dislodgment. The bolt 100 carries a handle 102 at one end and the handle is connected by a retaining chain 104 to a clip 106 on the bight of the channel 56. The middle of the bolt has a groove 108 which is engaged by the central point 110 of a leaf-spring 112 mounted on the flanges 60. It is easy to provide such a construction in which the bolt is securely held against accidental removal, but a pull of five pounds or so will push the point 110 up and let the bolt slide out. Similarly, when the bolt is inserted, the operator will have to push hard enough to force the point 110 up, to get the bolt into assembled position.

Referring now to Figures 8 to 15 inclusive, the blanket assembly includes a supporting network of steel ribbons, and a blanket proper, loosely affixed to the inner side of the network, to complete the closure. The narrow or right half blanket 20 has a network comprising sixteen horizontal tension strips 116 of steel ribbon, crossed at right angles by four vertical strips 118. The strips 116 lie outside the strips 118 as clearly indicated in Figure 10, and at their ends they are doubled adjacent the edge strip 118 and the entirety fastened together by a central grommet or rivet 120 carried in the bifurcated butt 122 of a lacing clip 124. The lacing clip tapers out to a width not materially less than three inches at the end where it receives the lacing, and terminates in a head 126 having a semi-circular groove at 128 defined on one side by the body of the clip 124 and on the other side by the tapered flange 130. This configuration makes it easy to lace a braided sash cord or flexible wire cable 132 into the groove 128. With the clips 124 about six inches apart and the lacing clips on the other blanket staggered, the free reaches of the lacing cord 132 will be approximately parallel to the tension strips 116. It is noted that there will be twice as many tension reaches 132 as strips 116 so that the tension load carried by each lacing will be substantially half that carried by each strip 116. At each other intersection between the strips 116 and 118 the strips are pivotally connected by a grommet or rivet 134 as indicated in Figure 1.

The strips 116 end, as diagrammatically indicated in Figure 13, in vertical alignment with a clamping strip 136 (see Figure 3). As clearly indicated there, each strip 116 is wrapped around three sides of the clamping strip 136 and the clamping strip is then drawn tight by means of fastening bolts 138.

The tension strips 140 for the wide left blanket half 18 are identical with strips 116 except that they are longer and there are seventeen of them. The wide blanket half employs seven vertical strips 142 which may be identical with the vertical strips 118. When adjusted as indicated in Figure 13 for an eight-foot door, the lacing clips 144 on the wide blanket half may be identical with the lacing clips 124. Mere rotation of the clip 124 one hundred eighty degrees around the position indicated in Figure 9 will position it for mounting on the other blanket half.

Substantially all freight car doors used for carrying grain at present are either six feet or eight feet wide. To adjust the same blanket for a six-foot door as indicated at the top of Figure 1, each tension strip 140 is provided with a slightly different lacing clip 146. The lacing clip 146 has a head and groove identical with the clips 124 and 144 but it lies beside its tension strip 140 and in contact therewith. Its butt 148 registers with an intersection between the tension strip 140 and the vertical load distributing strip 142 and is fastened to those strips by the rivet or grommet 150. We prefer to secure added strength at this point by riveting a cleat 152 to the tension strip 140 and a cleat 154 to the load distributing strip 142, to give the grommet 150 a better purchase. We also prefer to extend the head 148 around behind the cleat 154 as indicated at 156, to brace the assembly more firmly.

The half blankets proper are mere sheets of canvas. Along their upper edges, as best indicated in Figure 12, each blanket is looped back as at 158 and stitched at 160 to define a wide tubular hem which houses the top tension strip 140. The stitching 160 is omitted where the load distributing member 142 enters the hem, and the member 142 is wrapped around the tension member 140 and riveted at 162 to define a metal loop constituting the primary upper end support for the strip 142. The main weight of the entire canvas is carried by the top hem. To assist in holding the blanket in proper relationship with the network, we also provide a plurality of open fabric loops 164. There is one such loop bridging each reach of each vertical load distributing member 118 or 142 and a similar loop bridging each reach of each horizontal tension strip 116 or 140. In Figure 12 the left blanket half 166 is illustrated with the upper loop 164. The left blanket half 166 extends over the entire extent of the left network as clearly indicated in Figure 13 and also has a bottom flap 168 extending about eighteen inches below the network. This flap is integral with the right overlapping flap 170 which extends about fifteen inches beyond the right edge of the network from top to bottom. This flap is continued to form a relatively small triangular flap 172 which can conveniently be thrown over the upper edge of the narrow half blanket 115, to assist in keeping the flap 170 approximately in position until the material filled into the car imposes the load on it. Beyond the vertical line of the clamping strip 136, the wide blanket half is extended to form another vertical side flap 174 about fifteen inches wide, which will tend to lie against the long leg of the post 10, and the inside wall of the car beyond the post, until the filling of the car anchors it in that position.

The narrow half blanket 115 comprises a main portion co-extensive with the tension strips 116 and load distributing strips 118. It has a bottom flap 176 extending down about eighteen inches from the bottom edge and the flaps 176 and 170 overlap about a foot as clearly indicated at the bottom of Figure 13. It has a vertical side flap 178 identical in extent and function with side flap 174 except that it extends in the opposite direction.

When the device is assembled above the floor 180 at the level indicated in Figure 13, there is excess material at the corners beyond that necessary to form a seal. These corners can be left complete and all the canvas below the line 180 rolled up as in Figures 14 and 15, but we prefer to cut a narrow opening at 182 extending diagonally in, so that after the material between the openings 182 has been rolled up as in Figures 14 and 15, the triangular flaps at the bottoms of the extensions 174 and 178 can be laid over the wrapped bottom portion.

The bottom seal is simply and easily formed. The operator, standing on the floor 180 inside the car, merely lays a small strip of board on the extreme inner edge of the flaps 168 and 176 and rolls the board up in the flaps until it will not roll any farther. In Figure 14 we have illustrated the condition that would result if a meticulous operator happened to use a two-by-four 184 and do a "perfect" job. The flap 168 is illustrated with an edge portion 186 along one narrow side of the two-by-four, the bottom portion 188 across under it, a rising portion 190 along its outer edge, a top portion 192 coming back across the top, a descending portion 194 going down the inner side, and a second bottom portion 196 extending across the bottom and turning the corner snugly to join the main body portion 166. These parts will be held in place by the pressure of the grain after the car is loaded and by engagement by the ends of the board 184 with the lower ends of the posts 10 and 12. Also, the bottom tension strip 140 and the load distributing strip 142 lie against the board.

The condition illustrated in Figure 14 will not be achieved very often in regular service, but if the flap is wound up so that the final position of the board is within three inches or even six inches of the position indicated in Figure 14, an effective seal will result with equal certainty. In Figure 15 we have indicated the same board 184 lying spaced one inch from the tension strip 116 and distributing strip 118, and the flap 176 ends with the bottom portion 198 because it is not wide enough to reach around the next corner. With the parts in this condition the loading of the car will fill the space indicated at 200 with the grain or other material, and a perfect seal still results at all points.

Wheat is much heavier than oats, and it is the practice to fill wheat cars only partly full to avoid overloading the car. In Figure 1 we have illustrated the posts 10 and 12 braced with two struts 14 only, one of which is one foot above the floor and the other four feet above the floor. In many instances such a bracing is adequate to carry either wheat or oats, but when a full filling of the lighter grain carries the load up higher, it is a simple matter to put in three struts. The first strut will be one foot above the floor and engage the sockets 46—1; the next strut will be three feet above the floor and engage the sockets 46—3; and the top strut will be six feet above the floor and engage the struts 46—6.

In loading a car the operator fastens the posts 10 and 12 in position and puts the lacing 132 in place, beginning at the bottom. The customary loading practice will be such that the operator will only lace the blankets up about three or four feet and then a large loading device can have a large area of access to get most of the load in. After the car is about half loaded, it will be necessary to lace the blanket higher and finish the filling with a smaller delivery chute or other filling instrumentality. It will be obvious that the lacing 132 can be discontinued at any intermediate point and the lace tied around the last lacing clip used. And where three struts are used, the original installation can be with the two lower struts only until the car is half loaded so that the absence of the top strut affords ample access for the large loading equipment. Then, when the change is made to the smaller loading device, the top strut can be put in place at the same time that the upper half of the blanket is laced.

To unload a car it is only necessary to untie and remove the lacing, beginning at the top. The immediately adjacent grain will pour out past the operator as he stands beside the opening and removes the lacing. After the lacing is all removed, so much of the adjacent grain will have poured out that the operator can easily pull the lower portions of the blanket halves to either side and pick up and unroll the board 184. After that is done, the entire closure can be removed, before or after finishing the emptying of the car. The strut at 46—3 or 46—4 is preferably removed last and when it is removed, both the posts will fall into the hands of the operator. It will be obvious that the removed closure can be laid aside as a single package or a double package, whichever is most convenient. When using two struts, one strut can be laid in the angle occupied by the pillar 16 in Figure 3 and the half blanket can be wrapped around the post and strut to complete the packaging. The other strut may be similarly rolled up with the post 10. When there are three struts, the wider half blanket is large enough to roll up two struts with the post 10. It would appear to be relatively immaterial whether the two-by-four 184 is rolled up and taken along, or a new piece of board picked up when the closure is next installed.

Others may readily adapt the invention for use under various conditions of service by employing one or more of the novel features disclosed or equivalents thereof. For instance, where such devices are used in large numbers, it is a matter of cost and storage that will determine whether to employ blankets and struts that can be adjusted for either six-foot or eight-foot doors, or to carry a stock of six-foot closures and another stock of eight-foot closures. Similarly, with the adjustable blanket in the condition illustrated in Fig 13, the slot opened by removing the lacing is offset one foot from the center of the door. This will not occasion any material difficulty, but if loading devices call for it, it would be a simple matter to make the narrow blanket 115 six inches wider and the wide blanket 166 six inches narrower. With such a blanket, a six-foot door would have its slot offset only six inches from the center in one direction and the eight-foot door would have its slot offset six inches in the other direction.

With either braided sash cord or flexible wire cable for the lacing, it is not difficult to tie the lacing end with an ordinary knot, or around a simple cleat on the topmost tension strip. However, quick-detachable fastening means other than the ordinary lacing clip may save enough time to be desirable. In Figures 16 and 17 we have indicated an end clip comprising a simple claw plate 202 from which two spaced hooks 204 rise with their outer portions in diverging relationship. The lacing 132 is threaded through a conventional fastening head comprising the internally threaded main body 206 with a tapered end 208, and the gripping collet 210 having conventional, flexible fingers at its inner end to be forced radially inward by the tapered portion 208 when the collet is screwed into the body 206. With such a fastening head threaded on lacing 132, and a knot in the end of the lacing to prevent losing it, the operator simply completes the installation of the lacing over the clips and lays the taut lacing between the prongs 204 and slides the fastening head against the prongs 204 and screws in the collet. After a little practice this can be done in very little more time than it takes to tell about it.

We prefer to use networks and blankets of ample strength to carry ordinary loads without assistance other than the end connections with the posts 10 and 12 and the lateral contacts with the struts 14, which lateral contacts will tension the vertical strips 118 and 142 considerably in the lower portion of the closure. However, if the load material is of unusual characteristics, or the blanket is of rather light structure or badly worn, the lower blanket can be subdivided into three spans by setting a pair of smooth boards 212 about a foot wide between the struts and the blanket. The load in the car will hold the boards in place, or a meticulous operator may prefer to tie their upper ends to the adjacent strut.

We claim:

1. A closure for grain car doors comprising, in combination: two edge posts abuttable against the opposing vertical side pillars of a rectangular wall opening frame; each post being of generally L-shaped configuration in cross-section; a plurality of struts; said edge posts each having a plurality of socket means; each socket means severally opposing the socket means of the other post; the opposing socket means being adapted to receive the opposite end portions of one of said struts; each strut having means to force said edge posts into firm engagement with their cooperating pillars; a flexible blanket; said blanket comprising two half-blankets; each half-blanket having one vertical side edge affixed grain-tight to the wider flange of one of said edge posts; said half-blankets having vertically over-lapping portions adapted to form a grain-tight seal at the overlapping portions and along the bottom edge of the opening to be closed; and means for fastening said half-blankets together up the middle of said closure.

2. A closure for grain car doors comprising, in combination: two edge posts abuttable against the opposing vertical side pillars of a rectangular wall opening frame; each post being of generally L-shaped configuration in cross-section; compressible filler means between each post and its filler adapted to form a grain-tight seal under the force of the load retained by said closure; a plurality of removable struts for forcing said edge posts into firm engagement with their cooperating pillars; a flexible blanket of adjustable width; said blanket having edges affixed grain-tight to said edge posts and spanning the space between them; each edge post having a projection defining an abutment for the associated blanket between the adjacent affixed edge of said blanket and the center of said closure; said blanket having bottom flap means adapted to rest directly on a floor structure defining the bottom edge of the opening to be closed; said bottom flap means being wrapped around a rigid member; said rigid member lying in wrapped condition on said floor inside said closure in abutment with the lower ends of said edge posts and extending across the opening; said blanket comprising a grain-tight body sheet of flexible textile material, and a reinforcing network of cross-straps; said network comprising a series of flexible, metallic, horizontal tension straps spaced apart vertically, and a series of flexible, metallic load-spreading straps laid inside said tension straps and spaced apart horizontally; said tension and load-spreading straps being pivotally inter-connected at certain of their points of intersection; said struts, when assembled between said edge posts, lying close beside said blanket to function as an abutment against excessive sagging under load.

3. A closure for grain car doors comprising, in combination: two rigid edge posts abuttable against the opposing vertical side pillars of a rectangular wall opening frame; each post being of generally L-shaped configuration in cross-section; compressible filler means between each post and its filler adapted to form a grain-tight seal under the force of the load retained by said closure; a plurality of removable struts for forcing said edge posts into firm engagement with their cooperating pillars; a flexible blanket of adjustable width; said blanket having edges affixed grain-tight to said edge posts and spanning the space between them; each edge post having a projection defining an abutment for the associated blanket between the adjacent affixed edge of said blanket and the center of said closure; said blanket having bottom flap means adapted to rest directly on a floor structure defining the bottom edge of the opening to be closed; said bottom flap means being wrapped around a rigid member; said rigid member lying in wrapped condition on said floor inside said closure in abutment with the lower ends of said edge posts and extending across the opening; said blanket comprising a grain-tight body sheet of flexible textile material, and a reinforcing network of cross-straps; said network comprising a series of flexible, metallic, horizontal tension straps spaced apart vertically, and a series of flexible, metallic load-spreading straps spaced apart horizontally; said tension and load-spreading straps being inter-connected at their points of intersection; said struts, when assembled between said edge posts, lying close beside said blanket to function as an abutment against excessive sagging under load.

4. A closure for grain car doors comprising, in combination: two edge posts abuttable against the opposing vertical side pillars of a rectangular wall opening frame; a plurality of removable struts for forcing said edge posts into firm engagement with their cooperating pillars; and a flexible blanket; said blanket having its remote edges affixed grain-tight to said edge posts and spanning the space between them; said blanket having bottom flap means adapted to rest directly on a floor structure defining the bottom edge of the opening to be closed; said struts, when assembled between said edge posts, lying close beside said blanket to function as an abutment against excessive sagging under load.

5. A closure for grain car doors comprising, in combination: two edge posts abuttable against the opposing vertical side pillars of a rectangular wall opening frame; a plurality of removable struts for forcing said edge posts into firm engagement with their cooperating pillars; and a flexible blanket; said blanket having its remote edges affixed grain-tight to said edge posts and spanning the space between them; said blanket having bottom flap means adapted to rest directly on a floor structure defining the bottom edge of the opening to be closed.

6. A closure for grain car doors comprising, in combination: two edge posts abuttable against the opposing vertical side pillars of a rectangular wall opening frame; a plurality of struts; said edge posts each having a plurality of socket means; each strut having end portions shaped to fit said socket means; stressing means for placing each strut under compression load to force said edge posts into firm engagement with their cooperating pillars; said socket means being provided in multiple, spaced along the length of each edge post, to permit the installation of a pre-selected number of struts in any one of a number of pre-selected vertically spaced arrangements; and flexible blanket means for closing the opening between said posts.

7. A closure for grain car doors comprising, in combination: two rigid edge posts; means for fastening said posts along the side edges of a rectangular wall opening frame; and a flexible blanket means spanning the space between said posts; said blanket means, including a grain-tight body sheet of flexible textile material; and a reinforcing network of cross-straps; said body sheet lying inside said network to be pressed against said network by the load inside said closure; said network comprising a series of flexible, metallic, horizontal tension straps spaced apart vertically, and a series of flexible, metallic load-spreading straps laid inside said tension straps and spaced apart horizontally.

8. A closure for grain cars, which cars have a door opening, having a bottom defined by a horizontal floor, and sides defined by the inwardly facing edges of the walls of the car structure, comprising, in combination: two rigid edge posts, generally L-shaped in cross-section and abuttable against the inwardly facing edges of the sides of the door opening, and with the wall surfaces adjacent said edges facing toward the interior of the car; adjustable, rigid brace means for pressing said posts away from each other, to hold them in engagement with said wall surfaces; and a grain-tight, flexible blanket means tensionally connected between said edge posts; said blanket means normally lying close to said bracing means, whereby the yielding of said blanket means under load causes said blanket means to bear against said brace means.

9. A closure for grain cars, which cars have a door opening, having a bottom defined by a horizontal floor, and sides defined by the inwardly facing edges of the walls of the car structure, comprising, in combination: two rigid edge posts, generally L-shaped in cross-section and abuttable against the inwardly facing edges of the sides of the door opening, and with the wall surfaces adjacent said edges facing toward the interior of the car; adjustable, rigid brace means for pressing said posts away from each other, to hold them in engagement with said wall surfaces; and a grain-tight, flexible blanket means tensionally connected between said edge posts.

10. A closure for grain cars, which cars have a door opening, having a bottom defined by a horizontal floor, and sides defined by the inwardly facing edges of the walls of the car structure, comprising, in combination: two rigid edge posts abuttable against the inwardly facing edges of the sides of the door opening, and with wall surfaces adjacent said edges facing toward the interior of the car; rigid brace means for pressing said posts away from each other to hold them in engagement with said inwardly facing edges; and grain-tight, flexible blanket means tensionally connected between said edge posts.

11. A closure for grain cars, which cars have a door opening, having a bottom defined by a horizontal floor, and sides defined by the inwardly facing edges of the walls of the car structure, comprising, in combination: two edge posts abuttable against the inwardly facing edges of the sides of the door opening, and with wall surfaces adjacent said edges facing toward the interior of the car; rigid brace means for pressing said posts away from each other, to hold them in engagement with said inwardly facing edges; and grain-tight, flexible blanket means tensionally connected between said edge posts; said flexible blanket means comprising two half-blankets; each half-blanket being permanently attached near one vertical edge to one of said edge posts, and quick-detachable lacing means for fastening together and unfastening the proximate edges of said half-blankets to close and open said closure.

12. A closure for grain car doors comprising, in combination: two rigid edge posts; means for removably fastening said edge posts in firm engagement with the sides of a door opening frame; and a flexible blanket spanning the space between said edge posts; said fastening means being compression struts holding said posts in place by abutment with the sides of said door opening frame.

13. A closure for grain car doors, comprising, in combination: two edge posts; means for removably fastening said edge posts in firm engagement with the sides of a door opening frame by contact with said frame only, and without penetration or mutilation of said edge posts; and a flexible blanket spanning the space between said edge posts; said post fastening means including rigid members lying close outside said blanket, to engage said blanket under load and reduce the blanket tension.

14. A closure for grain car doors, comprising, in combination: two rigid edge posts; means for fastening said posts along the side edges of a rectangular wall opening frame; and a flexible blanket means spanning the space between said posts; said blanket means including a grain-tight body sheet of flexible textile material; and a reinforcing network of cross-straps; said cross-straps being pivotally connected at their intersections for relative rotation around axes normal to the plane of said network.

15. A closure for grain car doors comprising, in combination: two edge posts abuttable against the opposing vertical side pillars of a rectangular wall opening frame; a plurality of struts; said edge posts having socket means facing away from said pillars; said struts each having end portions shaped to fit said socket means; stressing means for placing each strut under compression load to force said edge posts into firm engagement with their cooperating pillars; a flexible blanket; said blanket comprising two half-blankets; each half-blanket having one vertical side edge affixed grain-tight to one of said edge posts; and adjustable tensioning means along the adjacent centrally located vertical edges of said half-blankets, for drawing said vertical edges together under substantial tension in the absence of any other load on said blanket; one of said half-blankets having a central flap portion extending horizontally, to lie inside said tensioning means and inside an adjacent portion of the other half-blanket and form a grain-tight seal adapted to be kept tight by a load of grain.

References Cited in the file of this patent

UNITED STATES PATENTS

| | | |
|---|---|---|
| 111,780 | Saladee | Feb. 4, 1871 |
| 254,630 | Farrar | Mar. 7, 1882 |
| 856,159 | Keller | June 4, 1907 |
| 2,116,260 | Corkran | May 3, 1938 |
| 2,310,860 | Moon | Feb. 9, 1943 |
| 2,331,048 | Schaaff | Oct. 5, 1943 |
| 2,361,081 | Brandon | Oct. 24, 1944 |
| 2,377,989 | Braun | June 12, 1945 |
| 2,483,523 | Brandon et al. | Oct. 4, 1949 |
| 2,565,997 | Stone | Aug. 28, 1951 |
| 2,595,087 | Leslie | Apr. 27, 1952 |